(12) United States Patent
Zhang

(10) Patent No.: US 10,060,387 B2
(45) Date of Patent: Aug. 28, 2018

(54) MULTI-STEP COMBUSTION CHAMBER WITH MULTI-STEP CYLINDER HEAD

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 15/189,987

(22) Filed: Jun. 22, 2016

(65) Prior Publication Data
US 2017/0370323 A1    Dec. 28, 2017

(51) Int. Cl.
| | |
|---|---|
| F02B 23/00 | (2006.01) |
| F02F 3/28 | (2006.01) |
| F02M 26/04 | (2016.01) |
| F02B 17/00 | (2006.01) |
| F02B 37/00 | (2006.01) |
| F02D 41/00 | (2006.01) |
| F02F 1/24 | (2006.01) |
| F02P 15/00 | (2006.01) |
| F02F 1/42 | (2006.01) |
| F02B 23/10 | (2006.01) |

(52) U.S. Cl.
CPC .............. *F02F 3/28* (2013.01); *F02B 17/005* (2013.01); *F02B 23/00* (2013.01); *F02B 23/104* (2013.01); *F02B 23/105* (2013.01); *F02B 37/00* (2013.01); *F02D 41/0007* (2013.01); *F02F 1/24* (2013.01); *F02F 1/42* (2013.01); *F02M 26/04* (2016.02); *F02P 15/00* (2013.01); *F02F 2001/245* (2013.01); *Y02T 10/144* (2013.01)

(58) Field of Classification Search
CPC ..... F02F 3/28; F02F 1/24; F02P 15/00; F02M 26/04; F02B 37/00; F02B 17/005; F02D 41/007
USPC .............................. 123/193.5, 661, 667, 671
See application file for complete search history.

(56) References Cited

U.S. PATENT DOCUMENTS

| | | | | |
|---|---|---|---|---|
| 2,826,185 | A | * | 3/1958 | Keydel ................... F02B 23/08 123/671 |
| 4,178,903 | A | * | 12/1979 | Yanagihara ......... F02B 19/1085 123/259 |
| 4,457,273 | A | * | 7/1984 | Andrews ................. F02B 23/00 123/193.6 |
| 4,494,489 | A | | 1/1985 | Seidl |
| 5,738,057 | A | * | 4/1998 | Vallejos .................. F01L 1/053 123/193.5 |
| 5,960,767 | A | | 10/1999 | Akimoto et al. |
| 6,257,199 | B1 | | 7/2001 | Kanda et al. |
| 7,347,181 | B2 | * | 3/2008 | Yamashita ............ F02B 17/005 123/295 |
| 9,010,296 | B2 | * | 4/2015 | Teshima ................ F02B 23/104 123/193.4 |

(Continued)

*Primary Examiner* — Marguerite McMahon

(74) *Attorney, Agent, or Firm* — Julia Voutyras; McCoy Russell LLP

(57) ABSTRACT

A combustion system is provided for an internal combustion engine including a cylinder head and a piston. In one example, a combustion system may include a cylinder head with a second cylinder surface angled relative to a first cylinder surface, an intake port coupled to the first cylinder surface, an exhaust port coupled to the second cylinder surface, and a piston with a first piston surface parallel to the first cylinder surface and a second piston surface parallel to the second cylinder surface.

19 Claims, 5 Drawing Sheets

(56) References Cited

U.S. PATENT DOCUMENTS

| | | | | |
|---|---|---|---|---|
| 9,845,766 B2* | 12/2017 | Jeffries | ................... | F02F 3/28 |
| 2005/0145212 A1* | 7/2005 | Komuro | ................. | F01L 1/022 |
| | | | | 123/193.5 |
| 2005/0252463 A1* | 11/2005 | Matsui | ..................... | F02F 1/40 |
| | | | | 123/41.82 R |
| 2007/0056556 A1* | 3/2007 | Yohso | ................... | F02B 23/08 |
| | | | | 123/308 |
| 2013/0104836 A1* | 5/2013 | Facciano | ................ | F02B 23/00 |
| | | | | 123/193.5 |

* cited by examiner

MULTI-STEP COMBUSTION CHAMBER WITH MULTI-STEP CYLINDER HEAD

FIELD

The present description relates generally to a combustion system including a cylinder head and a piston.

BACKGROUND/SUMMARY

An internal combustion engine may include a plurality of cylinders, each cylinder of the plurality of cylinders may including a piston disposed there. Each cylinder of the plurality of cylinders may be capped by a cylinder head to form a plurality of combustion chambers. In one embodiment, the internal combustion engine may be configured to receive fuel via direct injection. In other words, the plurality of combustion chambers may receive fuel (e.g., gasoline) via a plurality of fuel injectors, with each fuel injector of the plurality of fuel injectors disposed within a separate combustion chamber. One or more intake ports with separate intake valves disposed within each intake port may be coupled to each combustion chamber in order to supply a combustible gas (e.g., air) to each combustion chamber. The injected fuel and air may mix and be combusted within each combustion chamber. The resulting gases from combustion may then exit each combustion chamber via one or more exhaust ports coupled to each combustion chamber, with separate exhaust valves disposed within each exhaust port.

Vehicles including an internal combustion engine configured for direct injection as described above often experience hydrocarbon emissions as a result of uncombusted fuel exiting the combustion chambers via the exhaust ports. Uncombusted fuel may include fuel that accumulates on surfaces of each combustion chamber and/or piston due to fuel injector arrangement, spark plug arrangement, improper air/fuel ratio, etc.

Attempts to address reducing hydrocarbon emissions from an engine include configuring each piston and combustion chamber to decrease an amount of fuel accumulation on surfaces of the combustion chamber and/or piston. One example approach is shown by Kanda et al. in U.S. Pat. No. 6,257,199. Therein, a direct fuel injection-type spark ignition internal combustion engine is disclosed including a cavity formed in a top surface of a piston. Fuel is sprayed by a fuel injector into the cavity, and the fuel is then directed towards a spark plug by a plurality of walls formed by the cavity. Another example approach is shown by Akimoto et al. in U.S. Pat. No. 5,960,767. Therein, a combustion chamber of an in-cylinder direct fuel injection spark ignition engine is disclosed, with a top surface of the combustion chamber including an intake side surface and an exhaust side surface. The combustion chamber additionally includes a piston with a cavity formed within a top surface of the piston in order to reflect a fuel spray injected into the combustion chamber via a fuel injector.

However, the inventors herein have recognized potential issues with such systems. As one example, fuel injected towards a cavity of a piston may increase an amount of fuel in contact with surfaces of the piston. This may result in an increase in fuel accumulation on surfaces of the piston, which may increase an amount of hydrocarbon emissions from an engine due an incomplete combustion of the fuel. As another example, fuel injected into a combustion chamber during an end of a compression stroke of an engine (e.g., when a piston translates towards a top surface of the combustion chamber) may have an increased likelihood of accumulating on surfaces of the combustion chamber and/or piston due to a decreased volume of the combustion chamber during the compression stroke. In other words, when the piston approaches its highest position (e.g., a position nearest a cylinder head of the engine), the volume of the combustion chamber is decreased and a fuel injection distance may be decreased. This may result in incomplete combustion due to a decreased mixing of fuel and intake air.

In one example, the issues described above may be addressed by a system comprising: a cylinder head including a first cylinder surface coupled to an intake port and a second cylinder surface coupled to an exhaust port, the second surface angled relative to the first surface; and a piston including a first piston surface arranged parallel to and vertically in-line with the first cylinder surface and a second piston surface arranged parallel to and vertically in-line with the second cylinder surface. As one example, the cylinder head may include a third cylinder surface parallel to and above the first cylinder surface, and the third cylinder surface may be coupled with a fuel injector. The fuel injector may be arranged to inject fuel at an angle relative to the third cylinder surface and towards a first side of the combustion chamber. The fuel injector may additionally be configured to inject fuel during a start of a compression stroke or an end of an intake stroke of an engine. By configuring the cylinder head and piston in this way, a path of fuel injected into the combustion chamber may be increased. The longer fuel path may increase an amount of mixing of the fuel with intake air, which may reduce an amount of fuel deposited on surfaces of the combustion chamber and may increase an amount of fuel combustion within the combustion chamber. In this way, hydrocarbon emissions may be reduced and a fuel efficiency of the engine may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-5 are shown to scale, though other relative dimensions may be used.

DETAILED DESCRIPTION

Figure 2:
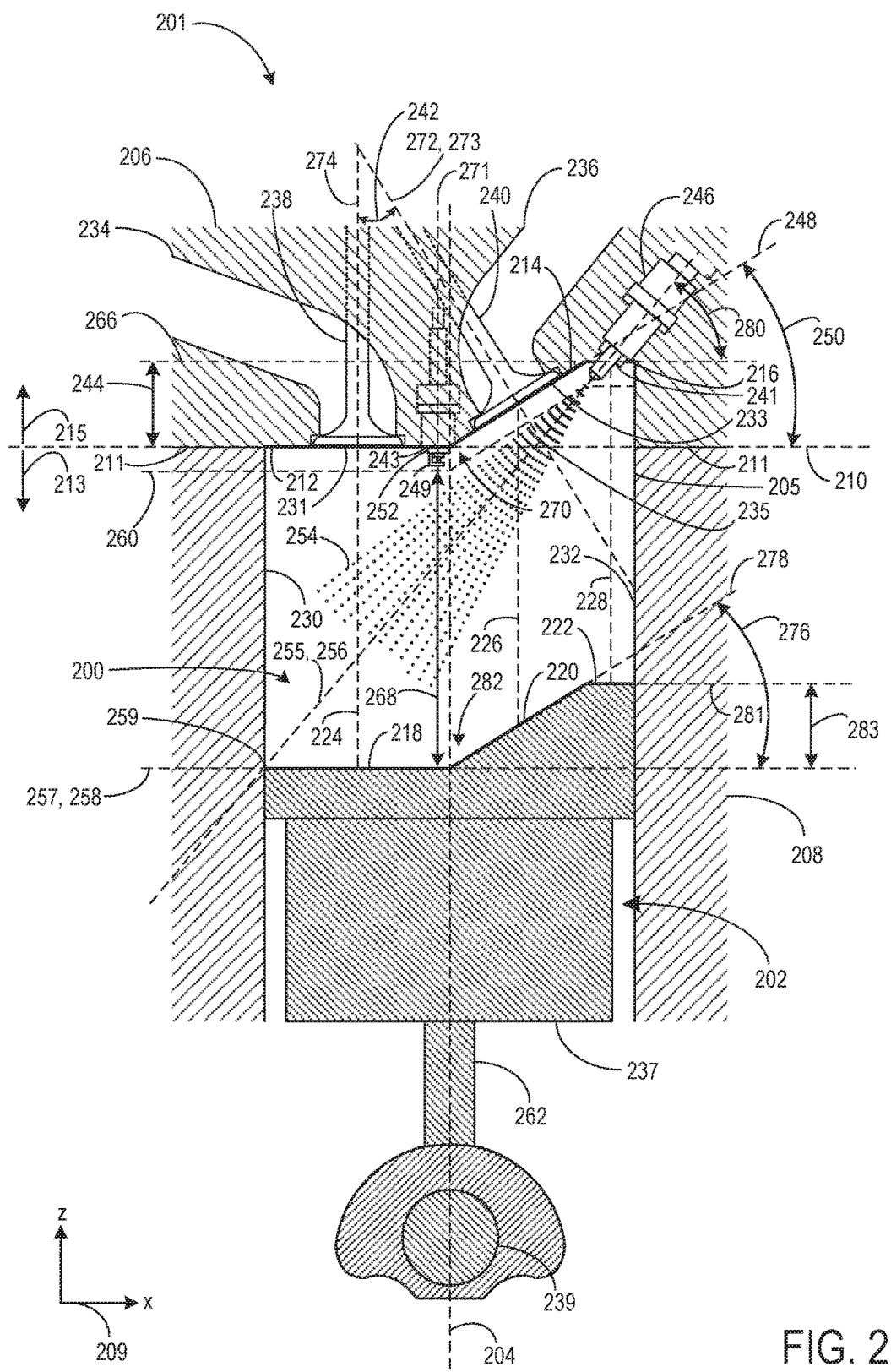
FIG. 2 shows a cross-sectional view of a system including a cylinder head, combustion chamber, and piston.
Figure 3:
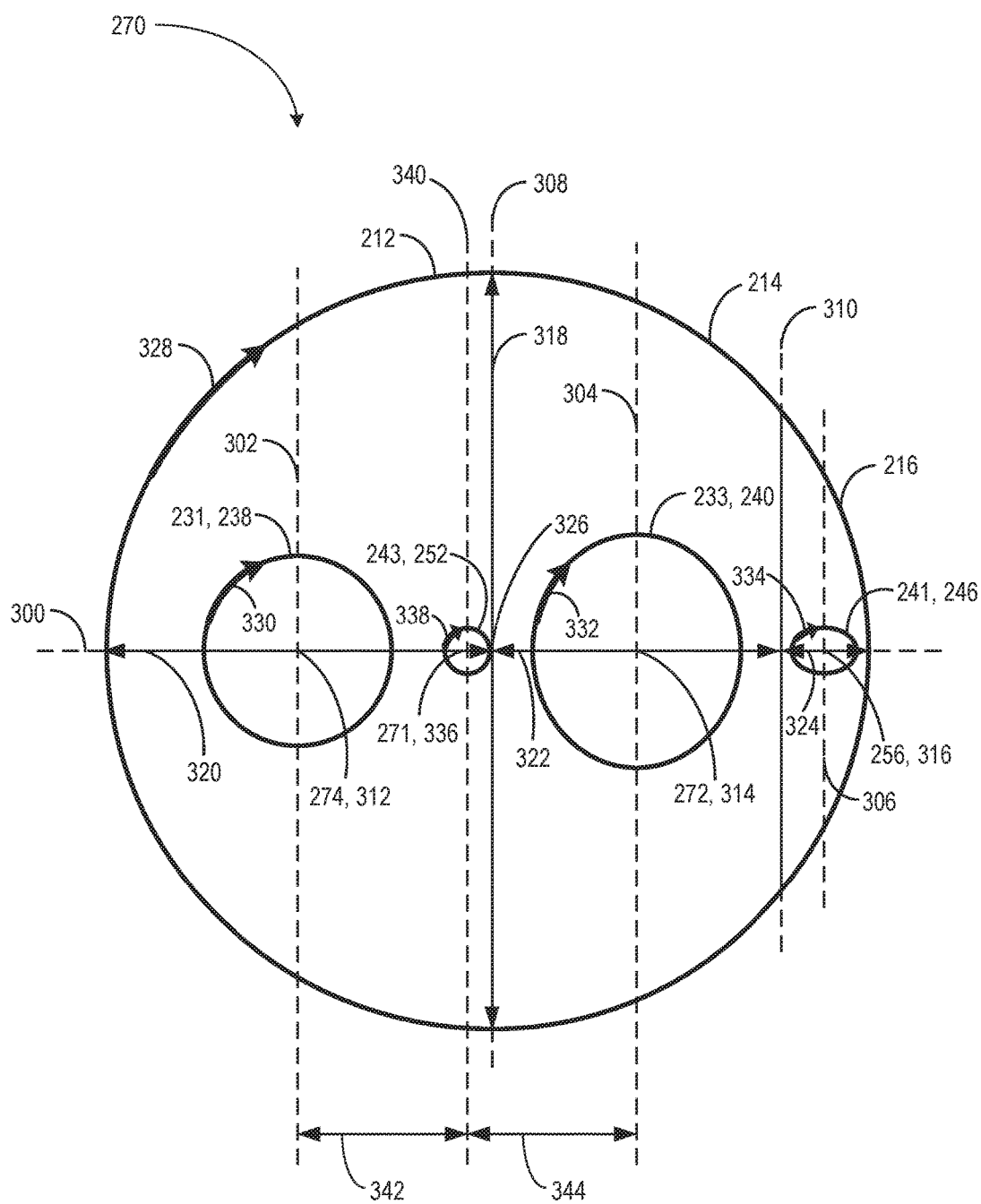
FIG. 3 shows a top surface of a combustion chamber included within the system of FIG. 2.
Figure 5:
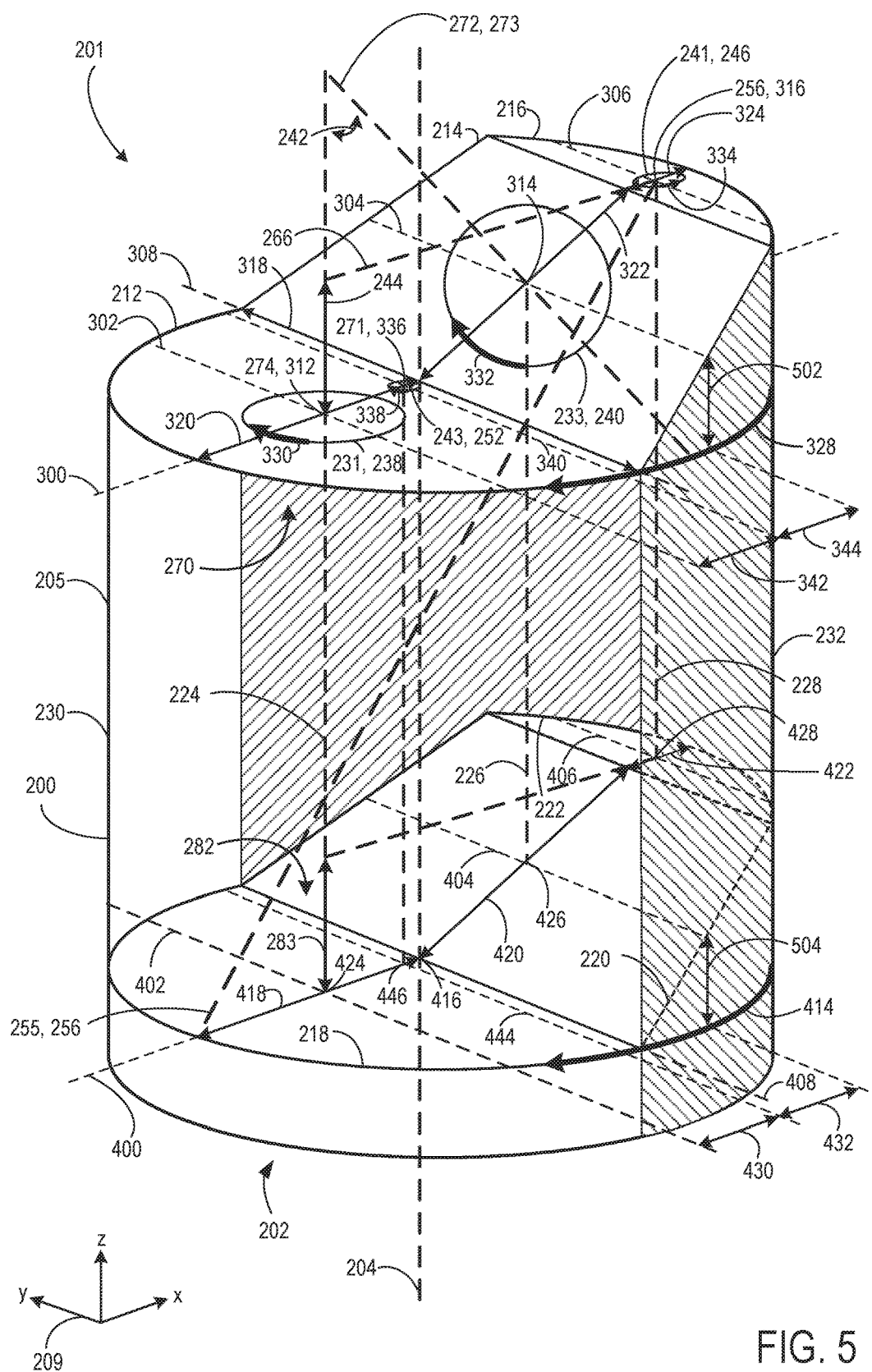
FIG. 5 shows a perspective view of the piston and the combustion chamber included within the system of FIG. 2.

The following description relates to a multi-step arrangement for a cylinder head and a piston. A combustion system including a cylinder head and a piston may be included within an internal combustion engine, such as the engine shown by FIG. 1. The engine may include a plurality of cylinders (e.g., combustion chambers) capped by the cylinder head. The cylinder head may include a first surface coupled to an intake port and a second surface coupled to an exhaust port for each cylinder, such as the cylinder shown by FIG. 2. Additionally, the second surface may be angled relative to the first surface, with the first surface coupled to a first side of each cylinder. The cylinder head may include a third surface coupled to a second side of each cylinder, with the second side of each cylinder opposite to the first side of each cylinder. In this arrangement, the first surface is positioned below the third surface and is coupled to the third surface by the angled second surface, as shown by FIG. 2 and FIG. 5. Each piston included within each cylinder includes a first piston surface and a second piston surface, with the second piston surface angled relative to the first piston surface as shown by FIGS. 2-3. The first piston surface may be below a third piston surface and may be coupled to the third piston surface by the second piston surface. An intake valve may be disposed within the intake port and an exhaust valve may be disposed within the exhaust port, as shown by FIG. 2. The intake valve, exhaust valve, fuel injector, and spark plug may be arranged along a shared axis, as shown by FIGS. 2-3 and FIG. 5. In this configuration, the surfaces of the piston are in an arrangement similar to the surfaces of the cylinder head, as shown by FIG. 2 and FIG. 5. In other words, the surfaces of the piston are formed to match the surfaces of the cylinder head.

Figure 1:
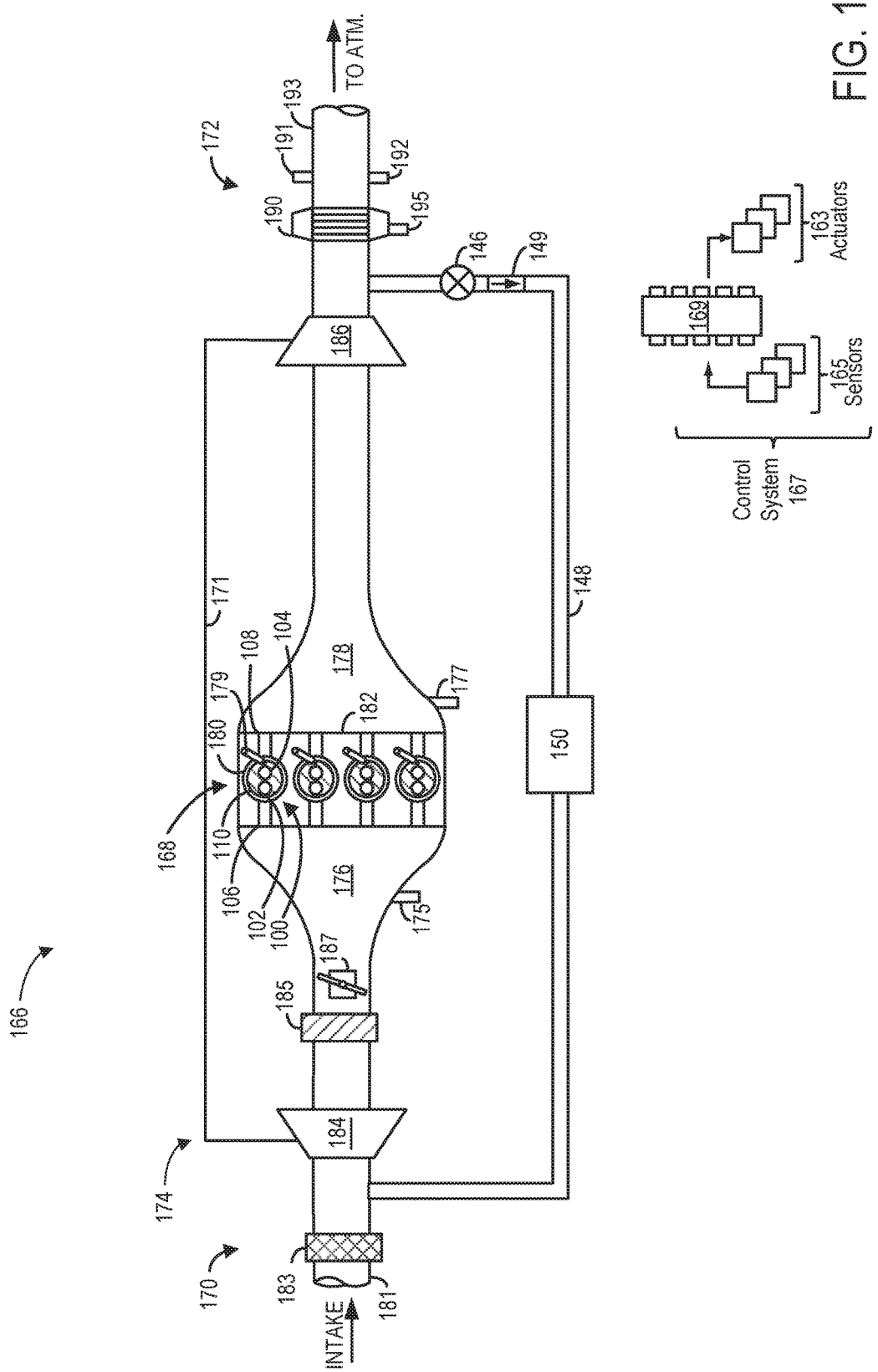
FIG. 1 shows a schematic of a system including an engine with a cylinder head and a plurality of combustion chambers.

FIG. 1 schematically shows a combustion system 100 included within an example engine system 166. The combustion system 100 includes cylinder head 182 and a plurality of pistons (such as piston 110). Each piston is included within a separate combustion chamber of a plurality of combustion chambers (such as combustion chamber 180). The cylinder head 182 may form a top surface of each combustion chamber of the plurality of combustion chambers as described below with reference to FIGS. 2-3 and FIG. 5. Engine system 166 (which includes combustion system 100) will be described herein with reference to FIG. 1, while components included in the combustion system 100 (such as cylinder head surfaces, piston surfaces, etc.) are described in further detail below following the description of FIG. 1 and with reference to FIGS. 2-5.

The schematic depicted by FIG. 1 shows engine system 166, with engine system 166 including an engine 168, an intake system 170, an exhaust system 172, and the combustion system 100. The engine 168 also includes a turbocharger 174 with a compressor 184 arranged within the intake system 170 and a turbine 186 arranged within the exhaust system 172. The compressor 184 is coupled to the turbine 186 by a shaft 171 and driven by the rotational motion of the turbine 186. Specifically, fresh air is introduced along intake passage 181 into engine 168 via air cleaner 183 and flows to compressor 184. The compressor may be any suitable intake-air compressor, such as a motor-driven or driveshaft driven supercharger compressor. In engine system 166, however, the compressor is a turbocharger compressor mechanically coupled to turbine 186 via shaft 171, and the turbine 186 is driven to rotate by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 184 is coupled, through charge-air cooler 185 to throttle valve 187. Throttle valve 187 is coupled to engine intake manifold 176. From the compressor, the compressed air charge flows through the charge-air cooler 185 and the throttle valve 187 to the intake manifold 176. The charge-air cooler 185 may be an air-to-air or air-to-water heat exchanger, for example. In the embodiment shown in FIG. 1, the pressure of the air charge within the intake manifold 176 is sensed by manifold air pressure (MAP) sensor 175. A compressor by-pass valve (not shown) may be coupled in series between the inlet and the outlet of compressor 184. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 176 is coupled to a plurality of combustion chambers (such as combustion chamber 180) through a plurality of intake ports (such as intake port 106). Each intake port includes at least one intake valve (such as intake valve 102). The combustion chambers (which may be referred to herein as cylinders) are further coupled to exhaust manifold 178 via a plurality of exhaust ports (such as exhaust port 108). Each exhaust port includes at least one exhaust valve (such as exhaust valve 104). The combustion chambers 180 are capped by cylinder head 182 and coupled to fuel injectors (such as fuel injector 179). Each combustion chamber includes a piston (such as piston 110). In the depicted embodiment, a single exhaust manifold 178 is shown. However, in other embodiments, the exhaust manifold may include a plurality of exhaust manifold sections. In the embodiment shown in FIG. 1, the pressure of the exhaust gases within the exhaust manifold 178 is sensed by manifold air pressure (MAP) sensor 177.

During operation, each combustion chamber (such as combustion chamber 180) within engine 168 typically undergoes a four stroke cycle: the cycle includes the intake stroke, compression stroke, expansion stroke, and exhaust stroke. As an example of operation of combustion chamber 180, the exhaust valve 104 may close and the intake valve 102 may open during the intake stroke. Air is introduced into the combustion chamber via intake manifold 176, and the piston 110 moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are typically closed. The piston moves toward the cylinder head 182 so as to compress the air within the combustion chamber. The point at which the piston is at the end of its stroke and closest to the cylinder head (e.g., when the combustion chamber is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as a spark plug (shown in FIGS. 2-3 and FIG. 5), resulting in combustion. During the expansion stroke, the expanding gases push the piston back to BDC. A crankshaft (such as the crankshaft shown by FIG. 2) converts piston movement into a rotational torque of the crankshaft. Finally, during the exhaust stroke, the exhaust valve opens to release the combusted air-fuel mixture to exhaust manifold 178 and the piston returns to TDC. Note that the above is shown merely as an example, and that intake and exhaust valve opening and/or closing timings may vary, such as to provide positive or negative valve overlap, late intake valve closing, or various other examples.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as desired for combustion and emissions-control performance.

Engine 168 may be controlled at least partially by a control system 167 including controller 169 and by input from a vehicle operator via an input device (not shown). Control system 167 is configured to receive information from a plurality of sensors 165 (various examples of which are described herein) and sending control signals to a plurality of actuators 163. As one example, sensors 165 may include temperature sensor 191 coupled to exhaust conduit 193, temperature sensor 195 coupled to emission control device 190, manifold air pressure sensor 175 coupled to intake manifold 176, and manifold air pressure sensor 177 coupled to exhaust manifold 178. Various exhaust gas sensors may also be included in exhaust system 172, within and/or downstream of exhaust manifold 178, such as particulate matter (PM) sensors, temperature sensors, pressure sensors, NOx sensors, oxygen sensors, ammonia sensors, hydrocarbon sensors, etc. Other sensors such as additional pressure, temperature, air/fuel ratio and composition sensors may be coupled to various locations in the engine system 166. As another example, actuators 163 may include fuel injector 179, valve 146 coupled to low-pressure exhaust gas recirculation (EGR) passage 148, intake valve 102, exhaust valve 104, and throttle valve 187. Other actuators, such as a variety of additional valves and throttles, may be coupled to various locations in engine system 166. Controller 169 may receive input data from the various sensors, process the input data, and trigger the actuators in response to the processed input data based on instruction or code programmed therein corresponding to one or more routines.

Controller 169 may be a microcomputer, and may include a microprocessor unit, input/output ports, an electronic storage medium for executable programs and calibration values such as a read only memory chip, random access memory, keep alive memory, and/or a data bus. Controller 169 may receive various signals from sensors coupled to engine 168, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft; throttle position (TP) from a throttle position sensor; absolute manifold pressure signal (MAP) from one or more intake and exhaust manifold sensors, cylinder air/fuel ratio from an exhaust gas oxygen sensor, and abnormal combustion from a knock sensor and a crankshaft acceleration sensor. Engine speed signal, RPM, may be generated by controller 169 from signal PIP. Manifold pressure signal MAP from a manifold pressure sensor may be used to provide an indication of vacuum, or pressure, in the intake manifold.

Storage medium read-only memory can be programmed with computer readable data representing instructions executable by a processor for performing the methods described below as well as other variants that are anticipated but not specifically listed. Example routines may include injection of fuel into a cylinder during an end of an engine intake stroke or a start of an engine compression stroke, as described in further detail with reference to FIG. 2 and FIG. 5.

FIG. 1 shows electronic control system 167, which may be any electronic control system of the vehicle in which engine system 166 is installed. In embodiments where at least one intake or exhaust valve is configured to open and close according to an adjustable timing, the adjustable timing may be controlled via the electronic control system to regulate an amount of exhaust present in a combustion chamber during ignition. The electronic control system may also be configured to command the opening, closure and/or adjustment of various other electronically actuated valves in the engine system-throttle valves, compressor by-pass valves, waste gates, EGR valves and shut-off valves, secondary air valves, various reservoir intake and exhaust valves, for example-to enact any of the control functions described herein. Further, to assess operating conditions in connection with the control functions of the engine system, the electronic control system may be operatively coupled to a plurality of sensors arranged throughout the engine system-flow sensors, temperature sensors, pedal-position sensors, pressure sensors, etc.

Combustion chambers 180 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition (via a spark plug as shown by FIGS. 2-3 and FIG. 5) and/or compression ignition.

As shown in FIG. 1, exhaust from the one or more exhaust manifold sections is directed to turbine 186 to drive the turbine 186, where it then flows through emission control device 190. In alternate embodiments (not shown), the engine system may possess a different number, arrangement, and/or relative processing capacity of emission control devices. Emission control device 190 may include one or more exhaust after-treatment catalysts configured to catalytically treat the exhaust flow, and thereby reduce an amount of one or more substances in the exhaust flow. For example, one exhaust after-treatment catalyst may be configured to trap NOx from the exhaust flow when the exhaust flow is lean, and to reduce the trapped NOx when the exhaust flow is rich. In other examples, an exhaust after-treatment catalyst may be configured to disproportionate NOx or to selectively reduce NOx with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow.

All or part of the treated exhaust from emission control device 190 may be released into the atmosphere via exhaust conduit 193. Temperature sensor 191 and flow sensor 192 are coupled to exhaust conduit 193 to monitor operating conditions. Additional sensors (not shown) may be included to detect exhaust pressure, composition, etc. Depending on operating conditions, some exhaust may be diverted instead to low-pressure (LP) EGR passage 148 via valve 146. An inlet port of an EGR cooler 150 is fluidically coupled with the LP EGR passage 148 to permit exhaust gases to flow through the EGR cooler 150 toward the intake system 170. In this manner, the engine system 166 is configured to admit exhaust tapped from upstream of emission control device 190 and downstream of the exhaust manifold 178. The valve 146 may be opened to admit a controlled amount of exhaust gas to the intake system 170 for desirable gas composition. A check valve 149 is included within LP EGR passage 148 downstream of the valve 146 to reduce a likelihood of flowing contents from the intake system 170 through LP EGR passage 148 towards the exhaust system 172. In this way, engine system 166 is adapted to adjustably flow exhaust gases from the exhaust system 172 to the intake system 170.

Components of an embodiment of the combustion system 100 are described in further detail below with reference to FIGS. 2-5. The example configuration of the engine system 166 described above is a non-limiting example and alternate embodiments of the engine system may include additional components not shown (e.g., one or more EGR coolers, heat exchangers, etc.). Alternate embodiments may also include a different number of combustion chambers, intake and/or exhaust valves, etc.

Figure 4:
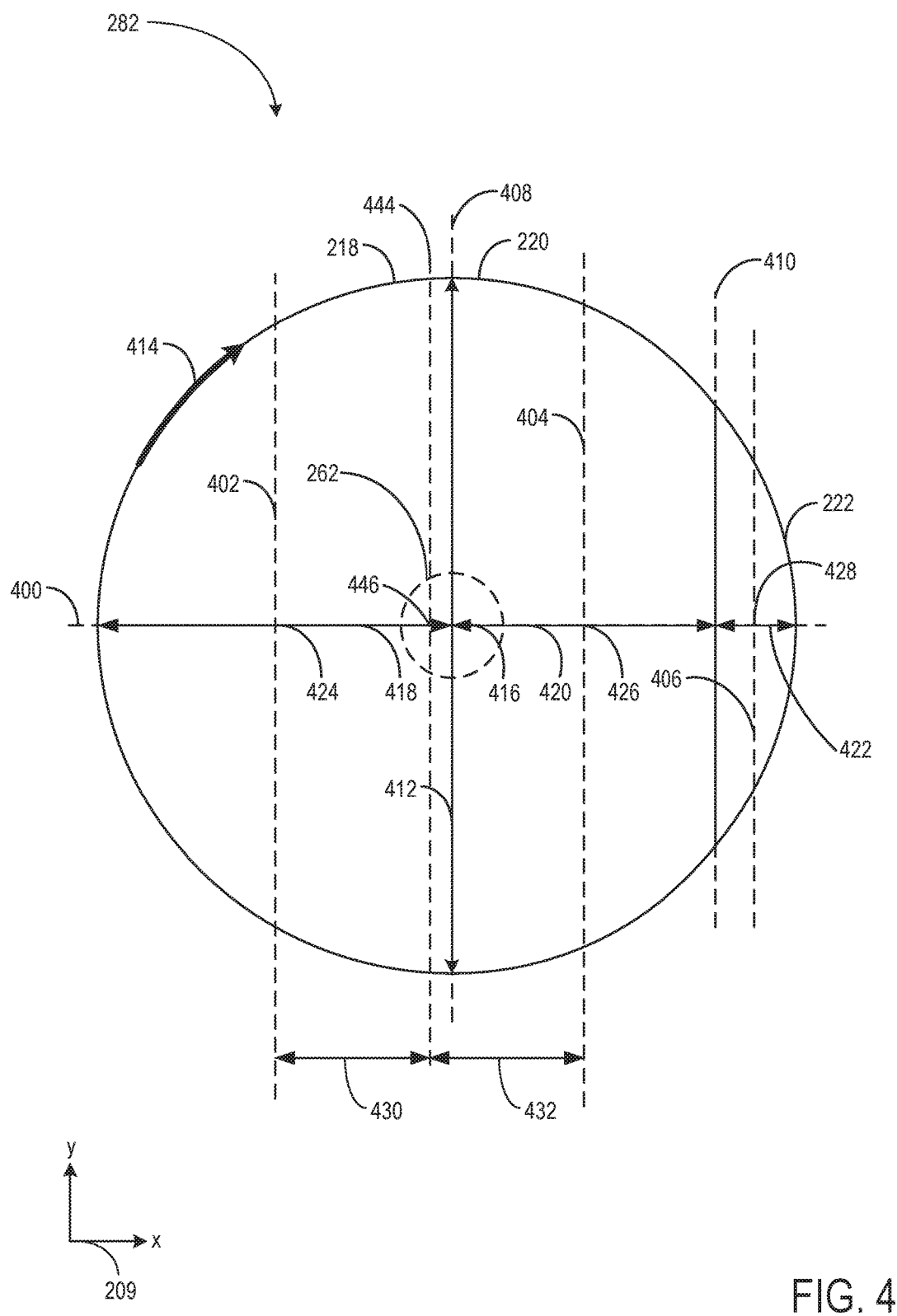
FIG. 4 shows a top surface of a piston included within the system of FIG. 2.

Reference axes 209 are included throughout FIGS. 2-5 in order to provide a relative reference between each view. FIGS. 2-5 each show an embodiment of the combustion system (e.g., a combustion system similar to combustion system 100 shown and described above with reference to FIG. 1) from different views. In other words, a same embodiment of the combustion system is shown by FIG. 2, FIG. 3, FIG. 4, and FIG. 5, but each of FIGS. 2-5 shows the combustion system from a different perspective. For example, FIG. 2 shows a cross-sectional profile of the combustion system, FIG. 3 shows a view of a top surface of a combustion chamber formed by the combustion system, FIG. 4 shows a view of a top surface of a piston of the combustion system, and FIG. 5 shows an approximately isometric view of the combustion chamber formed by the combustion system. Due to the depiction of the embodiment throughout FIGS. 2-5 as described above, similar parts between figures may be labeled similarly and not re-introduced.

FIG. 2 shows a cross-sectional view of a combustion system 201 (similar to the combustion system 100 shown by FIG. 1) including a cylinder head 206 and a piston 202. A combustion chamber 200 is formed by a cylinder 205 (e.g., a hollow cavity) internal to an interior of an engine block 208 and is capped by the cylinder head 206 such that surfaces of the cylinder head 206 (described in further detail below) form a top surface 270 of the combustion chamber 200. The combustion chamber 200 shown by FIG. 2 may be one of a plurality of combustion chambers included within an engine system (such as the engine system 166 shown by FIG. 1). Each combustion chamber of the engine system may be capped by the cylinder head 206 similar to the arrangement of the cylinder head 206 and combustion chamber 200 shown by FIG. 2.

The cylinder head 206 includes a first cylinder surface 212 and a second cylinder surface 214, with the second cylinder surface 214 angled relative to the first cylinder surface 212. For example, a second cylinder surface axis 248 arranged parallel to the second cylinder surface 214 may be rotated by a cylinder surface angle 250 relative to a parting axis 210 that is arranged parallel to the first cylinder surface 212. The parting axis 210 is arranged along a parting surface 211 of the cylinder head 206. The parting surface 211 of the cylinder head 206 is coupled to the engine block 208 and forms an interface between the cylinder head 206 and the engine block 208 (e.g., a location where the cylinder head 206 is coupled to and in face-sharing contact with the engine block 208). Thus, the cylinder head 206 is arranged vertically above (e.g., in a direction indicated by first arrow 215) the parting axis 210 while the engine block is arranged vertically below (e.g., in a direction indicated by second arrow 213, opposite to first arrow 215) the parting axis 210. The first cylinder surface 212 (and the parting axis 210) are both arranged perpendicular to a cylinder central axis 204 (which may herein be referred to as a vertical centerline) of the combustion chamber 200.

The cylinder head 206 additionally includes a third cylinder surface 216, with the third cylinder surface 216 parallel to the first cylinder surface 212 and the parting axis 210. The third cylinder surface 212 is positioned vertically above the first cylinder surface 212 (e.g., vertically in a direction parallel to the cylinder central axis 204 of the combustion chamber 200) as indicated by first vertical distance 244 between the parting axis 210 (arranged parallel to the first cylinder surface 212) and a third cylinder surface axis 266 (arranged parallel to the third cylinder surface 216). The second cylinder surface 214 is angled between the first cylinder surface 212 and the third cylinder surface 216 and couples the first cylinder surface 212 to the third cylinder surface 216. The first cylinder surface 212, second cylinder surface 214, and third cylinder surface 216 collectively form the cylinder top surface 270 of the combustion chamber 200.

Included within the combustion chamber 200 is the piston 202. The piston 202 is coupled to a crankshaft 239 of an engine (such as the engine 168 shown by FIG. 1) via a connecting rod 262 coupled to a piston bottom surface 237. The piston 202 may travel vertically (e.g., in a direction along cylinder central axis 204 and indicated by the z-axis of reference axes 209) within the combustion chamber 200 in response to operation of the engine (as described above with reference to FIG. 1). For example, the piston 202 may travel a cylinder distance 268 from a first position (e.g., bottom dead center) indicated by bottom dead center axis 257 to a second position (e.g., top dead center) indicated by top dead center axis 260 within an interior of the combustion chamber 200 during operation of the engine (e.g., during a compression stroke or exhaust stroke of the engine as described above with reference to FIG. 1). As a second example, the piston 202 may travel the cylinder distance 268 from the second position indicated by top dead center axis 260 to the first position indicated by bottom dead center axis 257 within the combustion chamber 200 during an intake stroke or expansion stroke of the engine as described above.

The piston 202 includes a first piston surface 218 and a second piston surface 220, with the first piston surface 218 parallel to the first cylinder surface 212 and the second piston surface 220 parallel to the second cylinder surface 214. The second piston surface 220 is angled relative to the first piston surface 218 such that a second piston surface axis 278 arranged parallel to the second piston surface 220 is rotated by a piston surface angle 276 relative to a first piston surface axis 258 parallel to the first piston surface 218, with the piston surface angle 276 approximately equal to the cylinder surface angle 250. In other words, the second piston surface 220 is rotated relative to the first piston surface 218 by approximately a same amount compared to the rotation of the second cylinder surface 214 relative to the first cylinder surface 212.

The piston 202 may also include a third piston surface 222, with the third piston surface 222 parallel to the third cylinder surface 216. In other words, a third piston surface axis 281 arranged parallel to the third piston surface 222 is also parallel to the third cylinder surface axis 266 parallel to the third cylinder surface 216. The second piston surface 220 is arranged between the first piston surface 218 and the third piston surface 222 and couples the first piston surface 218 to the third piston surface 222. The third piston surface 222 may be positioned above the first piston surface 218 by a vertical distance equal to a vertical distance that the third cylinder surface 216 is displaced above the first cylinder surface 212. In other words, the third piston surface 222 may be positioned vertically (e.g., in a direction along the cylinder central axis 204 and indicated by the z-axis of reference axes 209) above the first piston surface 218 by a second vertical distance 283, with the second vertical distance 283 being the same as the first vertical distance 244. The first piston surface 218, second piston surface 220, and third piston surface 222 collectively form a piston top surface 282 of the piston 202.

The first piston surface 218 is positioned vertically in-line and below the first cylinder surface 212 in a vertical direction along first vertical axis 224, with first vertical axis 224 parallel to the cylinder central axis 204 of the combustion chamber 200. The second piston surface 220 is positioned vertically in-line and below the second cylinder surface 214 in a vertical direction along second vertical axis 226, with second vertical axis 226 parallel to the cylinder central axis 204 of the combustion chamber 200. The third piston surface 222 is positioned vertically in-line and below the third cylinder surface 216 in a vertical direction along third vertical axis 228, with third vertical axis 228 parallel to the cylinder central axis 204 of the combustion chamber 200. The arrangement of the first piston surface 218, second piston surface 220, and third piston surface 222 relative to the first cylinder surface 212, second cylinder surface 214, and third cylinder surface 216 is described further below with reference to FIG. 5. Piston top surface 282, cylinder top surface 270, first side 230, and second side 232 collectively form boundaries (e.g., walls) of the combustion chamber 200 that define the combustion chamber 200 of the combustion chamber 200.

An intake port 234 (similar to the intake port 106 shown by FIG. 1) may be coupled to the first cylinder surface 212 via an intake aperture 231, and an intake valve 238 (similar to the intake valve 102 shown by FIG. 1) may be disposed partly within the intake port 234 and adapted to cover the intake aperture 231. The intake valve 238 may be actuated (e.g., cam-actuated or controller-actuated as described above with reference to FIG. 1) to increase a flow of combustible gases (e.g., air) into the combustion chamber 200 from intake port 234 when the intake valve 238 is opened, and to decrease the flow of combustible gases into the combustion chamber 200 from intake port 234 when the intake valve 238 is closed. An intake valve axis 274 (e.g., central axis) of the intake valve 238 may be coaxial with first vertical axis 224 and parallel to cylinder central axis 204. As a result, the intake valve 238 may be arranged within a center of the first cylinder surface 212 and vertically above a center of the first piston surface, as described in further detail below with reference to FIG. 3 and FIG. 5.

An exhaust port 236 (similar to the exhaust port 108 shown by FIG. 1) may be coupled to the second cylinder surface 214 via an exhaust aperture 233, and an exhaust valve 240 (similar to the exhaust valve 104 shown by FIG. 1) may be disposed within the exhaust port 236 and adapted to cover the exhaust aperture 233. The exhaust valve 240 may be angled such that the exhaust valve 240 is oriented towards a second side 232 of the combustion chamber 200. In other words, an exhaust valve axis 272 (e.g., central axis) of the exhaust valve 240 may be arranged in a direction perpendicular to the second cylinder surface 214 (e.g., perpendicular to second cylinder surface axis 248, with second cylinder surface axis 248 arranged parallel to the second cylinder surface 214) and the exhaust valve axis 272 may intersect a second side 232 of the combustion chamber 200. The exhaust valve 240 may be actuated (e.g., cam-actuated or controller-actuated as described above with reference to FIG. 1) to increase a flow of combusted gases (e.g., products of fuel and air ignition) from the combustion chamber 200 to the exhaust port 236 when the exhaust valve 240 is opened, and to decrease the flow of combusted gases from the combustion chamber 200 to the exhaust port 236 when the exhaust valve 240 is closed.

Due to the cylinder surface angle 250 between the first cylinder surface 212 and the second cylinder surface 214, the intake valve axis 274 (e.g., the axis through the intake valve 238) is not parallel to the exhaust valve axis 272 (e.g., the axis through the exhaust valve 240). In other words, the exhaust valve 240 is angled relative to the intake valve 238 by a valve angle 242. The intake valve axis 274 is parallel to the cylinder central axis 204, and so the exhaust valve axis 272 and exhaust valve 240 are also angled relative to the cylinder central axis 204 by valve angle 242.

As shown in FIG. 2, a fuel injector 246 is coupled to the third cylinder surface 216 via an injector aperture 241 within the third cylinder surface 216, and the fuel injector 246 may be adapted to cover the injector aperture 241. The fuel injector 246 may be actuated (e.g., by a controller, such as the controller shown by FIG. 1) to inject fuel (e.g., gasoline) into the combustion chamber 200. The fuel injector 246 is angled relative to the third cylinder surface 216 such that the fuel injector 246 may inject fuel (such as fuel stream 254) in a direction of a first side 230 of the combustion chamber 200. In other words, an injector axis 256 (e.g., central axis) of the fuel injector 246 is rotated by an injector angle 280 relative to the third cylinder surface axis 266 parallel to the third cylinder surface 216, and fuel may be injected in a direction along stream axis 255, where stream axis 255 is coaxial (e.g., parallel and aligned) with the injector axis 256 of the fuel injector 246 and arranged to intersect the first side 230 of the combustion chamber 200. The injector axis 256 of the fuel injector may intersect the exhaust valve axis 272 of the exhaust valve 240 at a first axis intersection 235. The stream axis 255 (and the injector axis 256 of the fuel injector 246) may intersect the first side 230 of the combustion chamber 200 at a second axis intersection 259 where the first piston surface 218 is at its lowest position (e.g., when the piston 202 is at bottom dead center). For example, the stream axis 255, injector axis 256, and bottom dead center axis 257 may each intersect the first side 230 at the same location, with the bottom dead center axis 257 parallel to and arranged along the first piston surface 218 when the piston 202 is at bottom dead center, and stream axis 255 and injector axis 256 arranged coaxial with each other (as described above).

The embodiment of the combustion system 201 shown by FIGS. 2-5 includes a spark plug 252 coupled to the first cylinder surface 212 via a plug aperture 243, and the spark plug 252 may be adapted to cover the plug aperture 243. A plug axis 271 (e.g., central axis) of the spark plug 252 may be parallel to both of the cylinder central axis 204 and the intake valve axis 274 such that the spark plug 252 is positioned parallel to the intake valve 238. A tip 249 (e.g., a portion of the spark plug 252 arranged within the combustion chamber) of the spark plug 252 may be positioned vertically above (e.g., in a direction along cylinder central axis 204 and the z-axis of reference axes 209) the first piston surface 218. The spark plug 252 may be actuated by a controller (such as the controller 169 shown by FIG. 1) to produce a spark in order to ignite a fuel (e.g., gasoline) and air mixture within the combustion chamber 200. While the embodiment shown by FIGS. 2-5 includes the spark plug 252, alternate embodiments may not include a spark plug. For example, an engine system (such as engine system 166 shown by FIG. 1) which includes the combustion system (e.g., the cylinder head and piston system) may be configured to operate by compression ignition of fuel (e.g., diesel) and may not include a spark plug.

By configuring the combustion system 201 as described above, a fuel injection path (e.g., fuel injection along stream axis 255) may be increased (e.g., elongated). For example, fuel may be injected into the combustion chamber when the piston is in the bottom dead center position (e.g., when the first piston surface 218 is aligned with the bottom dead center axis 257). When the piston is in the bottom dead center position, a distance from the fuel injector to the piston in a direction along the stream axis 255 (e.g., in a direction fuel travels when emerging from the fuel injector) may be increased. By increasing the distance that the injected fuel may travel before it impinges on a surface of the combustion chamber (e.g., first side 230, first piston surface 218, etc.) an amount of mixing of the injected fuel with intake air may be increased. The increased amount of mixing may result in a more complete combustion of the mixture by the combustion chamber, thereby reducing a likelihood of depositing fuel on surfaces of the combustion chamber as well as decreasing hydrocarbon emissions and soot emissions.

FIG. 3 shows the cylinder top surface 270 of the combustion chamber 200, as viewed from within the interior of the combustion chamber 200. The first cylinder surface 212 is shown coupled to the second cylinder surface 214 along an first joining axis 308 (e.g., first joining axis 308 indicates a location where the first cylinder surface 212 couples to the second cylinder surface 214), and the second cylinder surface 214 is shown coupled to the third cylinder surface 216 along an second joining axis 310 (e.g., second joining axis 310 indicates a location where the second cylinder surface 214 couples to the third cylinder surface 216). First joining axis 308 and second joining axis 310 (and the corresponding interfaces between the first cylinder surface 212 and the second cylinder surface 214, and the second cylinder surface 214 and the third cylinder surface 216) are arranged such that a surface area of the first cylinder surface 212 is greater than a surface area of the second cylinder surface 214, and the surface area of the second cylinder surface 214 is greater than a surface area of the third cylinder surface 216. In an alternate embodiment, an increased angle between the first cylinder surface and the second cylinder surface (e.g., increased relative to the cylinder surface angle 250 shown by FIG. 2) may result in an increased surface area of the second cylinder surface compared to an area of the first cylinder surface. In other words, the surface area of the second cylinder surface may be greater than the surface area of the first cylinder surface if the angle between the two surfaces is greater than a threshold angle. However, in each embodiment, the surface area of the third cylinder surface 216 is less than the surface area of each of the first cylinder surface 212 and the second cylinder surface 214.

First joining axis 308 is arranged along the location where the first cylinder surface is coupled (e.g., joined) to the second cylinder surface as described above, and cylinder diameter 318 is shown parallel to first joining axis 308. In the view shown by FIG. 3, the cylinder top surface 270 has a circular profile with an entire cylinder circumference 328 and is bisected by first joining axis 308 such that the first cylinder surface 212 is formed by one-half of the entire cylinder circumference 328 of the circular profile. A cylinder centerline 300 (e.g., a line parallel to the x-axis as shown by reference axes 209) is arranged perpendicular to first joining axis 308. The cylinder centerline 300 intersects a cylinder center midpoint 326 of the cylinder diameter 318 (arranged parallel to the y-axis as indicated by reference axes 209).

A cylinder first length 320 of the first cylinder surface 212 is parallel to the cylinder centerline 300 and extends from the cylinder circumference 328 to the first joining axis 308. A cylinder second length 322 of the second cylinder surface 214 is arranged parallel to the cylinder centerline 300 and extends from the first joining axis 308 to the second joining axis 310. A cylinder third length 324 of the third cylinder surface 216 extends parallel to the cylinder centerline 300 from the second joining axis 310 to the cylinder circumference 328. Each of intake intersecting axis 302, exhaust intersecting axis 304, and injector intersecting axis 306 extend along a direction parallel to the y-axis (as indicated by reference axes 209) and each of cylinder first length 320, cylinder second length 322, and cylinder third length 324 extend along a direction parallel to the x-axis (as indicated by reference axes 209). The intake intersecting axis 302 bisects the cylinder first length 320, the exhaust intersecting axis 304 bisects the cylinder second length 322, and the injector intersecting axis 306 bisects the cylinder third length 324. In other words, intake intersecting axis 302 intercepts an intake midpoint 312 of cylinder first length 320, exhaust intersecting axis 304 intercepts an exhaust midpoint 314 of cylinder second length 322, and exhaust intersecting axis 304 intercepts an injector midpoint 316 of cylinder third length 324.

The intake valve 238, the exhaust valve 240, the fuel injector 246, and the spark plug 252 are each aligned with the cylinder centerline 300 of the cylinder top surface 270. In other words, the intake valve 238, intake aperture 231, exhaust valve 240, exhaust aperture 233, fuel injector 246, injector aperture 241, spark plug 252, and plug aperture 243 are aligned with each other in a direction parallel to both of the x-axis and cylinder centerline 300 as indicated by reference axes 209 and shown by FIG. 3, but they are not aligned with each other in a direction parallel to the z-axis (as shown by FIG. 5). In one example arrangement (shown by FIGS. 2-3 and FIG. 5), the intake valve 238 is arranged within a center of the first cylinder surface 212. In other words, the intake valve axis 274 (shown by FIG. 2) intersects the intake midpoint 312 of cylinder first length 320 such that an intake aperture circumference 330 of the intake valve 238 is centered about the intake midpoint 312. The exhaust valve 240 is arranged within a center of the second cylinder surface 214 such that the exhaust valve axis 272 (shown by FIG. 2) intersects the exhaust midpoint 314 of cylinder second length 322. In this arrangement, an exhaust aperture circumference 332 of the exhaust valve 240 is centered about the exhaust midpoint 314. The fuel injector 246 is arranged within a center of the third cylinder surface 216 such that the injector axis 256 (shown by FIG. 2) intersects the injector midpoint 316 of cylinder third length 324. In this arrangement, an injector aperture perimeter 334 of the fuel injector 246 (as shown from the views of FIG. 3 and FIG. 5) is centered about the injector midpoint 316.

Plug intersecting axis 340 is shown perpendicular to cylinder centerline 300 and parallel to both of intake intersecting axis 302 and first joining axis 308. The plug intersecting axis 340 is arranged between intake intersecting axis 302 and exhaust intersecting axis 304 and is equidistant from each of intake intersecting axis 302 and exhaust intersecting axis 304 in a direction parallel to the x-axis (as indicated by reference axes 209). In other words, plug intersecting axis 340 is arranged a distance 342 in a direction parallel to the x-axis from the intake intersecting axis 302 and a distance 344 in a direction parallel to the x-axis from the exhaust intersecting axis 304, and both distance 342 and distance 344 have a same magnitude (e.g., a same amount of length). The spark plug 252 is arranged along the cylinder centerline 300 and centered about a plug intersection 336 of the plug intersecting axis 340 with the cylinder centerline 300. In other words, the plug axis 271 (shown by FIG. 2) is perpendicular to both of the plug intersecting axis 340 and the cylinder centerline 300 and passes through the plug intersection 336 while a plug aperture circumference 338 of the spark plug 252 is centered about the plug intersection 336 and arranged parallel to the second piston surface 220. In alternate embodiments, the plug intersecting axis 340 may be aligned with the first joining axis 308 such that the plug aperture 243 is centered about the cylinder center midpoint 326.

While the intake valve 238, exhaust valve 240, fuel injector 246, and spark plug 252 are each shown aligned with each other in a direction parallel to the cylinder centerline 300 as described above, alternate embodiments may include one or more of the intake valve, exhaust valve, fuel injector, and spark plug displaced from their positions described above in a direction parallel to the y-axis (e.g., the y-axis indicated by reference axes 209) and/or a direction parallel to the cylinder centerline 300 and x-axis (e.g., the x-axis indicated by reference axes 209). For example, in one embodiment (not shown), the intake valve may be arranged along the intake intersecting axis 302 as described above but may be displaced away from the cylinder centerline 300 and towards the cylinder circumference 328. Additionally, alternate embodiments may include a different number of intake valves and/or exhaust valves (e.g., two intake valves and two exhaust valves), and each intake valve and exhaust valve may be arranged differently relative to the non-limiting arrangement shown by FIG. 3. However, in each embodiment, an intake valve and spark plug are arranged within the first cylinder surface, an exhaust valve is arranged within the second cylinder surface, and a fuel injector is arranged within the third cylinder surface.

By arranging the intake valve, exhaust valve, fuel injector, and spark plug in this way, the amount of combustion of the fuel and air mixture may be increased and a likelihood of fuel impinging on surfaces of the combustion chamber may be reduced. For example, arranging the intake valve within the first cylinder surface and the fuel injector within the third cylinder surface increases a distance between the intake valve and the fuel injector, thereby reducing a likelihood of fuel deposits forming on and/or around the intake valve (e.g., on the first cylinder surface). Additionally, by arranging the spark plug between the intake valve and the exhaust valve, the spark plug may be coupled to the cylinder top surface in a position that increases combustion of the air and fuel mixture.

FIG. 4 shows the piston top surface 282 of the combustion chamber 200, as viewed from within the interior of the combustion chamber 200. The first piston surface 218 is shown coupled to the second piston surface 220 along an piston first axis 408 (e.g., piston first axis 408 indicates a location where the first piston surface 218 couples to the second piston surface 220), and the second piston surface 220 is shown coupled to the third piston surface 222 along an piston second axis 410 (e.g., piston second axis 410 indicates a location where the second piston surface 220 couples to the third piston surface 222). Piston first axis 408 and piston second axis 410 (and the corresponding interfaces between the first piston surface 218 and the second piston surface 220, and the second piston surface 220 and the third piston surface 222) are arranged such that a surface area of the first piston surface 218 is greater than a surface area of the second piston surface 220, and the surface area of the second piston surface 220 is greater than a surface area of the third piston surface 222. In an alternate embodiment, an increased angle between the first piston surface and the second piston surface (e.g., increased relative to the piston surface angle 276 shown by FIG. 2) may result in an increased surface area of the second piston surface compared to an area of the first piston surface. In other words, the surface area of the second piston surface may be greater than the surface area of the first piston surface if the angle between the two surfaces is greater than a threshold angle. However, in each embodiment, the surface area of the third piston surface 222 is less than the surface area of each of the first piston surface 218 and the second piston surface 220.

A piston diameter 412 is arranged parallel to piston first axis 408 of the piston top surface 282 along the location where the first piston surface 218 is coupled to the second piston surface 220 as described above. In the view shown by FIG. 4, the piston top surface 282 has a circular profile with an entire piston circumference 414 and is bisected by piston first axis 408 such that the first piston surface is formed by one-half of the entire piston circumference 414 of the circular profile. A piston centerline 400 (parallel to the first piston surface axis 258) is arranged perpendicular to piston first axis 408 and intersects a piston center midpoint 416 of the piston diameter 412 (with the piston diameter 412 arranged parallel to the y-axis as indicated by reference axes 209).

A piston first length 418 of the first piston surface 218 is arranged parallel to the piston centerline 400 and extends from the piston circumference 414 to the piston first axis 408. A piston second length 420 of the second piston surface 220 is arranged parallel to the piston centerline 400 and extends from the piston first axis 408 to the piston second axis 410. A piston third length 422 of the third piston surface 222 extends parallel to the piston centerline 400 from the piston second axis 410 to the piston circumference 414. Each of piston first intersecting axis 402, piston second intersecting axis 404, and piston third intersecting axis 406 extend along a direction parallel to the y-axis (as indicated by reference axes 209) and each of piston first length 418, piston second length 420, and piston third length 422 extend along a direction parallel to the x-axis (as indicated by reference axes 209). The piston first intersecting axis 402 bisects the piston first length 418, the piston second intersecting axis 404 bisects the piston second length 420, and the piston third intersecting axis 406 bisects the piston third length 422. In other words, piston first intersecting axis 402 intercepts a piston first midpoint 424 of piston first length 418, piston second intersecting axis 404 intercepts a piston second midpoint 426 of piston second length 420, and piston second intersecting axis 404 intercepts a piston third midpoint 428 of piston third length 422.

Piston fourth intersecting axis 444 is shown perpendicular to piston centerline 400 and parallel to both of piston first intersecting axis 402 and piston second intersecting axis 404. The piston fourth intersecting axis 444 is arranged between piston first intersecting axis 402 and piston second intersecting axis 404 and is equidistant from each of piston first intersecting axis 402 and piston second intersecting axis 404. In other words, piston fourth intersecting axis 444 is arranged a distance 430 from piston first intersecting axis 402 in a direction parallel to the x-axis (as shown by reference axes 209) and is arranged a distance 432 from piston second intersecting axis 404 in a direction parallel to the x-axis. Both of distance 430 and distance 432 have a same magnitude (e.g., a same amount of distance). A piston fourth midpoint 446 between the piston first intersecting axis 402 and the piston second intersecting axis 404 is arranged along the piston centerline 400 and is intersected by piston fourth intersecting axis 444. The plug axis 271 (shown by FIG. 2 and FIG. 5) is perpendicular to both of the piston centerline 400 and the piston fourth intersecting axis 444 and intersects the piston fourth midpoint 446. The piston fourth midpoint 446 accordingly corresponds to a location vertically below the spark plug 252 (shown by FIGS. 2-3 and FIG. 5) as described further below with reference to FIG. 5.

By configuring the surfaces of the piston as described above, the surface area of the first piston surface may be increased relative to the second piston surface and third piston surface. Increasing the surface area of the first piston surface may increase a path of fuel injection from the fuel injector. For example, with the fuel path directed towards the first side 230 (as shown by FIG. 2) and the first piston surface 218 (e.g., along stream axis 255 shown by FIG. 2 and FIG. 5), fuel injected by the fuel injector may have a reduced likelihood to impinge upon the first piston surface due to the lower vertical position of the first piston surface relative to the second piston surface and third piston surface (as shown by FIG. 2 and FIG. 5). In this way an accumulation of fuel on the piston top surface may be reduced, thereby reducing a likelihood of incomplete combustion of fuel and air within the combustion chamber.

FIG. 5 shows a perspective view of the embodiment of the combustion chamber 200 shown by FIG. 2. The combustion chamber 200 is formed by the cylinder top surface 270 shown by FIGS. 2-3 and the piston top surface 282 shown by FIG. 2 and FIG. 4, as described above. Specifically, FIG. 5 shows the combustion chamber 200 in three-dimensions as indicated by the x-axis, y-axis, and z-axis of reference axes 209.

As described above with reference to FIG. 3, the first cylinder surface 212 includes a cylinder first length 320, the second cylinder surface 214 includes a cylinder second length 322, and the third cylinder surface 216 includes a cylinder third length 324. Additionally, as described above with reference to FIG. 4, the first piston surface 218 includes a piston first length 418, the second piston surface 220 includes a piston second length 420, and the third piston surface 222 includes a piston third length 422. According to the embodiment shown by FIGS. 2-5, the cylinder first length 320 has approximately the same magnitude and is parallel to the piston first length 418, the cylinder second length 322 has approximately the same magnitude and is parallel to the piston second length 420, and the cylinder third length 324 has approximately the same magnitude and is parallel to the piston third length 422. The entire cylinder circumference 328 has approximately the same magnitude as the piston circumference 414, and the first vertical distance 244 has a same magnitude as the second vertical distance 283 (as described above with reference to FIG. 2). In other words, the first cylinder surface 212 has approximately a same outer circumference as the first piston surface 218 and is parallel to the first piston surface 218, the second cylinder surface 212 has approximately a same outer circumference as the second piston surface 220 and is parallel to the second piston surface 220, and the third cylinder surface 216 has approximately a same outer circumference as the third piston surface 222 and is parallel to the third piston surface 222 so that the piston top surface 282 has approximately the same outer boundaries as the cylinder top surface 270. In this way, the piston top surface 282 and the cylinder top surface 270 have approximately matching surfaces. However, the piston first length 418 may be slightly less than the cylinder first length 320, the piston second length 420 may be slightly less than the cylinder second length 322, and the piston third length 422 may be slightly less than the cylinder third length 324 in order to reduce the piston circumference 414 relative to the cylinder circumference 328 so that the piston 202 may move vertically (as described above in reference to FIG. 1) within the combustion chamber 200.

As described above with reference to FIG. 4, piston first intersecting axis 402 intersects a piston first midpoint 424 of piston first length 418 along the first piston surface 218. The piston first midpoint 424 is also intersected by vertical first vertical axis 224. Additionally, as described above with reference to FIG. 3, intake intersecting axis 302 intersects an intake midpoint 312 of cylinder first length 320 along the first cylinder surface 212. The intake midpoint 312 is also intersected by vertical first vertical axis 224. Due to the first cylinder surface 212 being parallel to the first piston surface 218 (as described above) and the vertical first vertical axis 224 intersecting both of intake midpoint 312 of the first cylinder surface 212 and piston first midpoint 424 of the first piston surface 218, the first piston surface 218 is vertically in-line with the first cylinder surface 212. In other words, the first cylinder surface 212 is parallel to the first piston surface 218 and is positioned vertically above the first piston surface 218 along first vertical axis 224.

A cross-section of intake valve 238 (e.g., within intake aperture 231) is shown arranged within the first cylinder surface 212. The intake valve 238 is arranged within the first cylinder surface 212 such that the intake aperture circumference 330 of the intake valve 238 is centered about the intake midpoint 312 (as described above with reference to FIG. 3). Due to the position of the first cylinder surface 212 vertically above (e.g., vertically in-line with) the first piston surface 218 as described above, and due to the centering of the intake aperture circumference 330 of the intake valve 238 about the intake midpoint 312, the intake valve 238 is also positioned vertically above the first piston surface 218. In other words, the first vertical axis 224 intersecting the intake midpoint 312 of the first cylinder surface 212 and the piston first midpoint 424 of the first piston surface 218 is coaxial (e.g., parallel and aligned) with the intake valve axis 274 of the intake valve 238. When the intake valve 238 is actuated (e.g., opened or closed by the controller or a cam of a camshaft, as described above with reference to FIG. 1) the intake valve 238 moves linearly along the first vertical axis 224 in a direction towards the first piston surface 218 when the intake valve 238 is opened and in a direction away from the first piston surface 218 when the intake valve 238 is closed.

A cross-section of spark plug 252 (e.g., within plug aperture 243) is also arranged within the first cylinder surface 212. The spark plug 252 is arranged within the first cylinder surface 212 such that the plug aperture circumference 338 of the spark plug 252 is centered about the plug intersection 336. As described above with reference to FIG. 3, the plug intersection 336 is arranged along the plug intersecting axis 340, with the plug intersecting axis 340 arranged the distance 342 from the intake intersecting axis 302 in a direction parallel to the x-axis and arranged the distance 344 from the exhaust intersecting axis 304 in a direction parallel to the x-axis. The distance 344 is shown positioned a vertical distance 502 below the exhaust intersecting axis 304 (e.g., at a same vertical position along the z-axis as the first cylinder surface 212) in order to illustrate that the distance 342 and the distance 344 are in a direction parallel to the x-axis (as indicated by reference axes 209). Due to the position of the first cylinder surface 212 vertically above (e.g., vertically in-line with) the first piston surface 218 as described above, and due to the centering of the plug aperture circumference 338 of the spark plug 252 about the plug intersection 336, the spark plug 252 is also positioned vertically above the first piston surface 218. In other words, the plug axis 271 of the spark plug 252 intersects the plug intersection 336 of the first cylinder surface 212 and the piston fourth midpoint 446 of the first piston surface 218 such that the spark plug 252 is coupled to the first cylinder surface 212 and positioned vertically in-line with piston fourth midpoint 446 of the first piston surface 218. As described above with reference to FIG. 3, the piston fourth midpoint 446 is arranged along the piston fourth intersecting axis 444, with the piston fourth intersecting axis 444 arranged the distance 430 in a direction parallel to the x-axis (as indicated by reference axes 209) from piston first intersecting axis 402 and the distance 432 in a direction parallel to the x-axis from the piston second intersecting axis 404. The distance 432 is shown positioned a vertical distance 504 below the piston second intersecting axis 404 (e.g., at a same vertical position along the z-axis as the first piston surface 218) in order to illustrate that the distance 430 and the distance 432 are in a direction parallel to the x-axis. In alternate embodiments, the spark plug 252 may be coupled to the first cylinder surface 212 and positioned vertically in-line with the piston center midpoint 416 (e.g., the central axis of the plug axis 271 may be coaxial and aligned with the cylinder central axis 204 of the combustion chamber 200).

Second cylinder surface 214 is positioned vertically above the second piston surface 220 similar to the positioning of first cylinder surface 212 vertically above first piston surface 218. Specifically, piston second intersecting axis 404 intersects a piston second midpoint 426 of piston second length 420 along the second piston surface 220. The piston second midpoint 426 is also intersected by vertical second vertical axis 226. Additionally, as described above with reference to FIG. 3, exhaust intersecting axis 304 intersects an exhaust midpoint 314 of cylinder second length 322 along the second cylinder surface 214. The exhaust midpoint 314 is also intersected by vertical second vertical axis 226. Due to the second cylinder surface 214 being parallel to the second piston surface 220 (as described above) and the vertical second vertical axis 226 intersecting both of exhaust midpoint 314 of the second cylinder surface 214 and piston second midpoint 426 of the second piston surface 220, the second piston surface 220 is vertically in-line with the second cylinder surface 214. In other words, the second cylinder surface 214 is parallel to the second piston surface 220 and is positioned vertically above the second piston surface 220 along second vertical axis 226.

A cross-section of exhaust valve 240 (e.g., within exhaust aperture 233) is shown arranged within the second cylinder surface 214. The exhaust valve 240 is arranged within the second cylinder surface 214 such that the exhaust aperture circumference 332 of the exhaust valve 240 is centered about the exhaust midpoint 314 (as described above with reference to FIG. 3). Due to the position of the second cylinder surface 214 vertically above (e.g., vertically in-line with) the second piston surface 220 as described above, and due to the centering of the exhaust aperture circumference 332 of the exhaust valve 240 about the exhaust midpoint 314 (and parallel to the second cylinder surface 214), the exhaust valve 240 is also positioned vertically above the second piston surface 220. In other words, exhaust aperture circumference 332 of the exhaust valve 240 is centered about the second vertical axis 226 which intersects the exhaust midpoint 314 of the second cylinder surface 214 and the piston second midpoint 426 of the first piston surface 218. However, in contrast to the arrangement of the intake aperture circumference 330 of the intake valve 238 parallel to the first cylinder surface 212 as described above, the exhaust aperture circumference 332 of the exhaust valve 240 is arranged parallel to the second cylinder surface 214 (and the second piston surface 220). For example, as described above with reference to FIG. 1, the exhaust valve axis 272 is angled relative to the intake valve axis 274 by the valve angle 242. When the exhaust valve 240 is actuated (e.g., opened or closed by the controller or a cam of a camshaft, as described above with reference to FIG. 1) the exhaust valve 240 moves linearly along an exhaust axis 273 in a direction towards the second side 232 of the combustion chamber 200 when the exhaust valve 240 is opened and in a direction away from the second side 232 of the combustion chamber 200 when the exhaust valve 240 is closed.

Third cylinder surface 216 is positioned vertically above the third piston surface 222 similar to the positioning of second cylinder surface 214 vertically above second piston surface 220. Specifically, piston third intersecting axis 406 intersects a piston third midpoint 428 of piston third length 422 along the third piston surface 222. The piston third midpoint 428 is also intersected by vertical third vertical axis 228. Additionally, as described above with reference to FIG. 3, injector intersecting axis 306 intersects an injector midpoint 316 of cylinder third length 324 along the third cylinder surface 216. The injector midpoint 316 is also intersected by vertical third vertical axis 228. Due to the third cylinder surface 216 being parallel to the third piston surface 222 (as described above) and the vertical third vertical axis 228 intersecting both of injector midpoint 316 of the third cylinder surface 216 and piston third midpoint 428 of the third piston surface 222, the third piston surface 222 is vertically in-line with the third cylinder surface 216. In other words, the third cylinder surface 216 is parallel to the third piston surface 222 and is positioned vertically above the third piston surface 222 along third vertical axis 228.

A cross-section of fuel injector 246 (e.g., within injector aperture 241) is shown arranged within the third cylinder surface 216. The fuel injector 246 is arranged within the third cylinder surface 216 such that the injector aperture perimeter 334 of the fuel injector 246 is centered about the injector midpoint 316 (as described above with reference to FIG. 3). Due to the position of the third cylinder surface 216 vertically above (e.g., vertically in-line with) the third piston surface 222 as described above, and due to the centering of the injector aperture perimeter 334 of the fuel injector 246 about the injector midpoint 316 (and parallel to the third cylinder surface 216), the fuel injector 246 is also positioned vertically above the third piston surface 222. In other words, injector aperture perimeter 334 of the fuel injector 246 is centered about the third vertical axis 228 which intersects both of the injector midpoint 316 of the third cylinder surface 216 and the piston third midpoint 428 of the first piston surface 218 and is coaxial (e.g., parallel and aligned) with the injector axis 256 of the fuel injector 246. When the fuel injector 246 is opened (e.g., opened by the controller as described above with reference to FIG. 1) the fuel injector 246 increases an injection of fuel into the interior of the combustion chamber 200 along the stream axis 255 in a direction towards the first side 230, and when the fuel injector 246 is closed (e.g., by the controller) the fuel injector 246 decreases the injection of fuel into the interior of the combustion chamber 200.

FIGS. 2-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of coupling the intake port to the first cylinder surface, coupling the exhaust port to the second cylinder surface, arranging the first piston surface parallel and vertically in-line with the first cylinder surface, arranging the second piston surface parallel and vertically in-line with the second cylinder surface, and angling the second cylinder surface relative to the first cylinder surface is to separate the fuel injector (coupled to the third cylinder surface) from the intake valve and increase the path of fuel injection from the fuel injector to the piston top surface. In this way, the amount of mixing of the injected fuel with intake air may be increased. The increased amount of mixing may result in a more complete combustion of the mixture by the combustion chamber, thereby reducing a likelihood of depositing fuel on surfaces of the combustion chamber as well as decreasing hydrocarbon emissions and soot emissions. The separation of the fuel injector from the intake valve may reduce a likelihood of fuel deposits forming on and/or around the intake valve and the first cylinder surface. By arranging the spark plug between the intake valve and the exhaust valve, the spark plug may be coupled to the cylinder top surface in a position that increases combustion of the air and fuel mixture and engine performance (e.g., engine torque output) may be increased.

In one embodiment, a system includes: a cylinder head including a first cylinder surface coupled to an intake port and a second cylinder surface coupled to an exhaust port, the second surface angled relative to the first surface; and a piston including a first piston surface arranged parallel to and vertically in-line with the first cylinder surface and a second piston surface arranged parallel to and vertically in-line with the second cylinder surface. In a first example of the system, the first piston surface is arranged vertically in-line with the first cylinder surface and the second piston surface is arranged vertically in-line with the second cylinder surface along a vertical direction, the vertical direction parallel to a vertical, central axis of a cylinder coupled with the cylinder head, and where the piston is adapted to travel in the vertical direction from top to bottom dead center positions within the cylinder. A second example of the system optionally includes the first example and further includes a third cylinder surface and a third piston surface arranged parallel to and vertically in-line with the third cylinder surface, the third cylinder surface positioned vertically above the first cylinder surface, relative to a vertical, central axis of the cylinder along which the piston travels, and the second cylinder surface angled between the first cylinder surface and third cylinder surface. A third example of the system optionally includes one or both of the first and second examples, and further includes wherein the third piston surface is positioned vertically above the first piston surface, relative to a vertical, central axis of the cylinder along which the piston travels, and the second piston surface is angled between the first piston surface and the third piston surface. A fourth example of the system optionally includes one or more or each of the first through third examples, and further includes wherein the second piston surface is angled relative to the first piston surface by a same amount as the second cylinder surface is angled relative to the first cylinder surface. A fifth example of the system optionally includes one or more or each of the first through fourth examples, and further includes wherein the third piston surface is positioned a first distance vertically above the first piston surface and the third cylinder surface is positioned a second distance vertically above the first cylinder surface, where the first distance is the same as the second distance. A sixth example of the system optionally includes one or more or each of the first through fifth examples, and further includes a fuel injector coupled to the third cylinder surface, the fuel injector angled toward a first side of the cylinder and a location of the first piston surface when the piston is in the bottom dead center position, where the first side is coupled to the first cylinder surface. A seventh example of the system optionally includes one or more or each of the first through sixth examples, and further includes an intake valve disposed in the intake port and adapted to cover an intake aperture in the first cylinder surface and an exhaust valve disposed in the exhaust port and adapted to cover an exhaust aperture in the second cylinder surface, where the exhaust valve is angled relative to the intake valve and a vertical, central axis of the cylinder. An eighth example of the system optionally includes one or more or each of the first through seventh examples, and further includes wherein the exhaust valve is angled toward a second side of the cylinder, the second side coupled to the third cylinder surface, and wherein a line through a central axis of the exhaust valve intersects a line through a central axis of the fuel injector. A ninth example of the system optionally includes one or more or each of the first through eighth examples, and further includes wherein the first piston surface, second piston surface, and third piston surface form a top surface of the piston and wherein a bottom surface of the piston arranged opposite the top surface is coupled to a crankshaft. A tenth example of the system optionally includes one or more or each of the first through ninth examples, and further includes a spark plug coupled to the first cylinder surface, where the spark plug is arranged between the intake aperture and the second cylinder surface.

In one embodiment, a cylinder head includes: a first surface arranged perpendicular to a vertical centerline of the cylinder head and on a first side of the cylinder head; a second surface arranged perpendicular to the centerline and on a second side of the cylinder head, the second side opposite the first side relative to the centerline, the second surface positioned vertically below the first surface; and a third surface angled between the first surface and the third surface. In a first example of the cylinder head, each of the first surface, second surface, and third surface form a top surface of the cylinder head and wherein a parting surface of the cylinder head, arranged parallel to the first surface, is adapted to couple with a cylinder, where the cylinder and top surface of the cylinder head form a combustion chamber and wherein the centerline of the cylinder head is a centerline of the combustion chamber. A second example of the cylinder head optionally includes the first example and further includes wherein the first surface includes a first aperture adapted to receive a fuel injector. A third example of the cylinder head optionally includes one or each of the first and second examples, and further includes wherein the second surface is adapted to couple with an intake port and includes a second aperture adapted to receive an intake valve. A fourth example of the cylinder head optionally includes one or more or each of the first through third examples, and further includes wherein the third surface is adapted to couple with an exhaust port and includes a third aperture adapted to receive an exhaust valve. A fifth example of the cylinder head optionally includes one or more or each of the first through fourth examples, and further includes wherein the second surface includes a fourth aperture adapted to receive a spark plug.

In one embodiment, a system includes: a cylinder block including a cylinder with a vertical centerline, a first side, and a second side, the first and second sides arranged opposite one another relative to the centerline; a cylinder head including a parting surface coupled to the cylinder and a top surface including each of: a first cylinder head surface arranged on the first side of the cylinder and perpendicular to the centerline; a second cylinder head surface arranged on the second side of the cylinder and parallel to and vertically above the first cylinder head surface; and a third cylinder head surface angled between the first cylinder head surface and the second cylinder head surface; and a fuel injector coupled to the second surface and angled toward the first side and away from the top surface. In a first example of the system, the first cylinder head surface is coupled to the first side, and the second cylinder head surface is coupled to the second side. A second example of the system optionally includes the first example, and further includes a piston disposed within the cylinder, the piston adapted to travel along the centerline and including a piston top surface including each of: a first piston surface arranged parallel to and vertically in-line with the first cylinder surface; a second piston surface arranged parallel to and vertically in-line with the second cylinder surface; and a third piston surface arranged parallel to and vertically in-line with the third cylinder surface.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a cylinder head including a first cylinder surface coupled to an intake port and a second cylinder surface coupled to an exhaust port, the second cylinder surface angled relative to the first cylinder surface;
a piston including a first piston surface arranged parallel to and vertically aligned with the first cylinder surface and a second piston surface arranged parallel to and vertically aligned with the second cylinder surface; and
a third cylinder surface and a third piston surface arranged parallel to and vertically aligned with the third cylinder surface, the third cylinder surface positioned vertically above the first cylinder surface, relative to a vertical, central axis of a cylinder along which the piston travels, and the second cylinder surface angled between the first cylinder surface and the third cylinder surface.

2. The system of claim 1, wherein the first piston surface is arranged vertically aligned with the first cylinder surface and the second piston surface is arranged vertically aligned with the second cylinder surface along a vertical direction, the vertical direction parallel to the vertical, central axis of the cylinder coupled with the cylinder head, and where the piston is adapted to travel in the vertical direction from top to bottom dead center positions within the cylinder.

3. The system of claim 2, wherein the third piston surface is positioned vertically above the first piston surface, relative to the vertical, central axis of the cylinder along which the piston travels, and the second piston surface is angled between the first piston surface and the third piston surface.

4. The system of claim 3, wherein the second piston surface is angled relative to the first piston surface by a same amount as the second cylinder surface is angled relative to the first cylinder surface.

5. The system of claim 3, wherein the third piston surface is positioned a first distance vertically above the first piston surface and the third cylinder surface is positioned a second distance vertically above the first cylinder surface, where the first distance is the same as the second distance.

6. The system of claim 5, further comprising a fuel injector coupled to the third cylinder surface, the fuel injector angled toward a first side of the cylinder and a location of the first piston surface when the piston is in the bottom dead center position, where the first side is coupled to the first cylinder surface.

7. The system of claim 6, further comprising an intake valve disposed in the intake port and adapted to cover an intake aperture in the first cylinder surface and an exhaust valve disposed in the exhaust port and adapted to cover an exhaust aperture in the second cylinder surface, where the exhaust valve is angled relative to the intake valve and the vertical, central axis of the cylinder.

8. The system of claim 7, wherein the exhaust valve is angled toward a second side of the cylinder, the second side coupled to the third cylinder surface, and wherein a line through a central axis of the exhaust valve intersects a line through a central axis of the fuel injector.

9. The system of claim 2, wherein the first piston surface, the second piston surface, and the third piston surface form a top surface of the piston and wherein a bottom surface of the piston arranged opposite the top surface is coupled to a crankshaft.

10. The system of claim 7, further comprising a spark plug coupled to the first cylinder surface, where the spark plug is arranged between the intake aperture and the second cylinder surface.

11. A cylinder head, comprising:
a first surface arranged perpendicular to a vertical centerline of the cylinder head and on a first side of the cylinder head;
a second surface arranged perpendicular to the centerline and on a second side of the cylinder head, the second side opposite the first side relative to the centerline, the second surface positioned vertically below the first surface; and
a third surface angled between the first surface and the second surface.

12. The cylinder head of claim 11, wherein each of the first surface, the second surface, and the third surface form a top surface of the cylinder head and wherein a parting surface of the cylinder head, arranged parallel to the first surface, is adapted to couple with a cylinder, where the cylinder and the top surface of the cylinder head form a combustion chamber and wherein the centerline of the cylinder head is a centerline of the combustion chamber.

13. The cylinder head of claim 11, wherein the first surface includes a first aperture adapted to receive a fuel injector.

14. The cylinder head of claim 13, wherein the second surface is adapted to couple with an intake port and includes a second aperture adapted to receive an intake valve.

15. The cylinder head of claim 14, wherein the third surface is adapted to couple with an exhaust port and includes a third aperture adapted to receive an exhaust valve.

16. The cylinder head of claim 15, wherein the second surface includes a fourth aperture adapted to receive a spark plug.

17. A system, comprising:
a cylinder block including a cylinder with a vertical centerline, a first side, and a second side, the first and second sides arranged opposite one another relative to the centerline;
a cylinder head including a parting surface coupled to the cylinder and a top surface including each of:
a first cylinder head surface arranged on the first side of the cylinder and perpendicular to the centerline;
a second cylinder head surface arranged on the second side of the cylinder and parallel to and vertically above the first cylinder head surface; and
a third cylinder head surface angled between the first cylinder head surface and the second cylinder head surface; and
a fuel injector coupled to the second cylinder head surface and angled toward the first side and away from the top surface.

18. The system of claim 17, wherein the first cylinder head surface is coupled to the first side, and the second cylinder head surface is coupled to the second side.

19. The system of claim 17, further comprising a piston disposed within the cylinder, the piston adapted to travel along the centerline and including a piston top surface including each of:
a first piston surface arranged parallel to and vertically aligned with the first cylinder head surface;
a second piston surface arranged parallel to and vertically aligned with the second cylinder head surface; and
a third piston surface arranged parallel to and vertically aligned with the third cylinder head surface.

* * * * *